(12) United States Patent
Paik et al.

(10) Patent No.: US 7,514,815 B2
(45) Date of Patent: Apr. 7, 2009

(54) SYSTEM AND METHOD FOR ALLOCATING POWER TO LOADS

(75) Inventors: Nam Wook Paik, Acton, MA (US); Lance Palmer Haines, Wilmington, MA (US); Vishwas Mohaniraj Deokar, Nashua, NH (US); James H. Donalds, Lunenburg, MA (US); Michael Manganese, Peabody, MA (US)

(73) Assignee: American Power Conversion Corporation, West Kingston, RI (US)

( * ) Notice: Subject to any disclaimer, the term of this patent is extended or adjusted under 35 U.S.C. 154(b) by 342 days.

(21) Appl. No.: 10/952,565

(22) Filed: Sep. 28, 2004

(65) Prior Publication Data
US 2006/0072262 A1    Apr. 6, 2006

(51) Int. Cl.
H02J 7/00    (2006.01)
(52) U.S. Cl. ...................................... 307/64
(58) Field of Classification Search .............. 307/64, 307/66
See application file for complete search history.

(56) References Cited

U.S. PATENT DOCUMENTS

| | | | |
|---|---|---|---|
| 3,705,280 A | 12/1972 | Harms | |
| 4,231,029 A | 10/1980 | Johnston | |
| 4,611,289 A | 9/1986 | Coppola | |
| 4,674,031 A | 6/1987 | Siska, Jr. | |
| 4,763,013 A | 8/1988 | Gvoth, Jr. et al. | |
| 4,769,555 A | 9/1988 | Pequet et al. | |
| 4,918,562 A | 4/1990 | Pulizzi et al. | |
| 5,081,367 A | 1/1992 | Smith et al. | |
| 5,270,576 A | 12/1993 | Kahle | |
| 5,424,903 A | 6/1995 | Schreiber | |
| 5,450,334 A | 9/1995 | Pulizzi et al. | |
| 5,462,225 A | 10/1995 | Massara et al. | |
| 5,534,734 A | 7/1996 | Pugh et al. | |
| 5,646,459 A | 7/1997 | Hatate et al. | |
| 5,721,934 A | 2/1998 | Scheurich | |
| 5,923,103 A | 7/1999 | Pulizzi et al. | |
| 5,939,802 A | 8/1999 | Hornbeck | |
| 6,011,327 A | 1/2000 | Cook et al. | |
| 6,172,428 B1 | 1/2001 | Jordan | |
| 6,172,432 B1 | 1/2001 | Schnackenberg et al. | |
| 6,181,028 B1 | 1/2001 | Kern et al. | |
| 6,330,176 B1 | 12/2001 | Thrap et al. | |
| 6,570,269 B2 | 5/2003 | McMillan et al. | |

(Continued)

FOREIGN PATENT DOCUMENTS

GB        516 265        12/1939

OTHER PUBLICATIONS

Partial International Search for PCT/US2005/018469 mailed Sep. 2, 2005.

(Continued)

*Primary Examiner*—Stephen W Jackson
*Assistant Examiner*—Michael Rutland Wallis
(74) *Attorney, Agent, or Firm*—Lowrie, Lando & Anastasi, LLP

(57) ABSTRACT

A system and method for adaptive control of power among a plurality of loads based on a categorization of the loads as either delayable or non-delayable, wherein the non-delayable loads are preferably supplied power over the delayable loads. In one aspect, the system may be used to allocate limited power from a backup power source.

36 Claims, 6 Drawing Sheets

U.S. PATENT DOCUMENTS

| | | | |
|---|---|---|---|
| 6,630,752 | B2 | 10/2003 | Fleming et al. |
| 6,633,802 | B2 * | 10/2003 | Sodoski et al. ............... 701/36 |
| 6,683,778 | B2 | 1/2004 | Yugou |
| 6,721,672 | B2 | 4/2004 | Spitaels et al. |
| 6,741,442 | B1 | 5/2004 | McNally et al. |
| 6,765,373 | B1 | 7/2004 | Harvey et al. |
| 6,825,578 | B2 | 11/2004 | Perttu |
| 6,876,103 | B2 | 4/2005 | Radusewicz et al. |
| 6,879,060 | B2 | 4/2005 | Hohri |
| 7,015,599 | B2 * | 3/2006 | Gull et al. .................... 307/85 |
| 7,098,555 | B2 * | 8/2006 | Glahn et al. .................. 307/32 |
| 7,141,891 | B2 | 11/2006 | McNally et al. |
| 7,142,950 | B2 | 11/2006 | Rasmussen et al. |
| 7,282,813 | B2 | 10/2007 | Unger et al. |
| 2002/0130556 | A1 | 9/2002 | Hohri |
| 2002/0134567 | A1 | 9/2002 | Rasmussen et al. |
| 2003/0034693 | A1 | 2/2003 | Wareham et al. |
| 2003/0048004 | A1 | 3/2003 | Fleming et al. |
| 2003/0048005 | A1 | 3/2003 | Goldin et al. |
| 2003/0062775 | A1 | 4/2003 | Sinha |
| 2003/0072977 | A1 | 4/2003 | Speranza et al. |
| 2003/0111842 | A1 | 6/2003 | Gilbreth et al. |
| 2004/0075343 | A1 * | 4/2004 | Wareham et al. .............. 307/39 |
| 2004/0084965 | A1 | 5/2004 | Welches et al. |
| 2004/0169972 | A1 | 9/2004 | Goss |
| 2007/0018506 | A1 | 1/2007 | Paik et al. |

OTHER PUBLICATIONS

MGE UPS Systems Brochure, "Galaxy 3000—Data Center Grade Power Protection for Critical Environments," Dec. 2001, 4 pps.

MGE UPS System Brochure, "Galaxy PW—Next Generation Critical Power Protection System," Jun. 2002, 2 pps.

Cutler-Hammer, "Switchboards Integrated Facility Switchboards," Jan. 2003, vol. 1, Ref. No. (0893), 1 pp.

APC User's Guide Brochure, "InfraStruXure Manager," Mar. 2004, 181 pps.

* cited by examiner

SYSTEM AND METHOD FOR ALLOCATING POWER TO LOADS

BACKGROUND OF THE INVENTION

1. Field of Invention

The present invention relates to systems and methods for efficiently applying power to a plurality of loads, including controlling switching of circuits between a primary power source and at least one secondary power source.

2. Discussion of Related Art

Transfer switches are often used in association with portable or stand-alone electrical generators in order to switch a source of electricity for a load between a utility electricity supply and the back-up generator.

For example, a private residence may normally receive its electrical power from a utility company. For various reasons, however (location in a region prone to severe weather, unreliable utility power, etc.), a homeowner may desire a back-up source of electrical power so that electrical devices and appliances in the residence can be powered during periods in which utility power is unavailable. The back-up generator may typically be a gasoline, diesel, propane or natural gas internal combustion engine-powered electrical generator, capable of generating an alternating voltage. The back-up generator may be installed in or near the residence and arranged to be connected to one or more of the electrical circuits in the residence in order to provide the desired back-up power.

It may often be undesirable and often illegal or a code violation to leave the back-up generator permanently connected, in parallel with the utility power, to the residential electrical circuits. Thus, conventional residential transfer switches, typically including a manually actuated switch, are used to connect and disconnect the back-up generator. For example, when the switch is thrown, the connection between the residential circuit(s) and whichever power source (i.e., utility or generator) is at the time actually connected to the residential circuit, is broken, before the connection is made between the residential circuit, and the power source which is being substituted in.

Conventional manual transfer switches are capable of providing the simple function of serving to safely accomplish the substitution of power sources. However, such manual switches typically require the presence of an operator in order to accomplish the transfer. This may be undesirable, in that some appliances (e.g., refrigerator or freezer, sump pump, etc.) should not go without power for extended periods of time and an operator may not be present at the time of a power outage to throw the switch. In addition, manual transfer switches require the circuits to be manually switched to the generator, and as such have no means of load control or overload protection other than fuses or circuit breakers. Manual transfer switches also have no automatic means of controlling non-critical loads.

Also available are conventional automatic transfer switches that are capable of actuating automatically, upon sensing a sustained interruption of utility-supplied electrical power. Traditionally, a generator used with the switch is selected to match the load, however, an overload may cause the generator to stall or a circuit breaker to trip, or both. Automatic transfer switches, if they do come with load-shedding features, generally require a complicated installation and configuration process.

One example of an automatic transfer switch and a method of load control for an automatic transfer switch that sheds and reconnects loads based upon a "preselected prioritized hierarchy" is described in U.S. Pat. No. 6,172,432 B1 to Schnackenberg et al., entitled "Automatic Transfer Switch," which is herein incorporated by reference in its entirety. The system of the '432 patent provides the benefit of preventing generator overload while making sure high priority loads remain powered. A disadvantage of the system of the '432 patent, however, is that the use of all lower-priority loads may be prevented if a high-priority load requires power.

Generators may be used without transfer switches, however, this may be dangerous due to the possibility of backfeed into the utility power or shock hazard. As discussed above, manual transfer switches do not provide any load control and are easy to overload. Overloads can happen during initial inrush or during steady state operation. When a generator (or other backup source such as a UPS) is overloaded during a blackout, a manual restart or reset may be required. Thus, power to critical loads may be turned off inadvertently, but permanently, through, for example, a non-critical load causing an overload.

Conventional generators also do not provide uninterrupted power because they typically require ten or more seconds to start. UPS's do provide this capability, but they are typically designed as point backup and can be difficult to hardwire into building wiring. Using both generators (for long term backup) and UPS's (for short term, uninterrupted power) is a good solution but is often difficult and expensive to design and install for the average homeowner or small business.

Existing methods and systems also do not account for the possibility of a third source (i.e. a UPS or a second generator), and are often expensive while providing only limited functionality. There is thus a need for an automatic transfer switch that is easily and safely connectable, cost effective, and provides wide range of adaptability and functionality.

SUMMARY OF INVENTION

At least one embodiment of the invention is directed to a system or method of controlling power to a plurality of loads based on a characterization of the loads as delayable or non-delayable.

A first aspect if the invention is directed to a method for controlling power supplied to a plurality of loads. The method includes categorizing the plurality of loads into one of a first group identified as delayable loads and a second group identified as non-delayable loads, allocating power to each load in the second group of loads, and allocating any remaining power to loads in the first group of loads.

In the method, allocating any remaining power to loads in the first group may include selecting loads from the first group to maximize use of the remaining power. The method may further include disconnecting one load of the first group of loads in event of an overload based on a determination of which load caused the overload. The method may further include monitoring the plurality of loads in real-time and dynamically allocating the remaining power to the loads in the first group of loads. Dynamically allocating may include characterizing each load in terms of peak power and steady-state power. At least one of the loads in the second group of loads may be characterized as operable with one type of back-up source and allocating power to the at least one load may include allocating power from only the one type of back-up source. Categorizing the plurality of loads may include for each load identifying a load type, and using a default setting to categorize each load based on the load type. The method may further include allowing a user to change the default setting. The method may further include setting default values for electrical parameters for each load based on the load type. The electrical parameters may include a surge power rating and a steady state power rating. The method may further include allowing a user to change the default values for the electrical parameters. The method may include updating values of the electrical parameters based on measured values. The method may also include monitoring power use to the plurality of loads while the plurality of loads are operating from a primary source of power, and providing a recommendation for a back-up source of power based on the power use.

A second aspect of the invention is directed to a system for controlling power to a plurality of loads from a plurality of power sources, wherein at least one of the plurality of power sources is a primary power source and at least one of the power sources is a back-up power source. The system includes a first input to receive power from the primary power source, a second input to receive power from the back-up power source, a plurality of outputs to provide output power to the plurality of loads, a plurality of controllable switches each coupled to the first input, the second input and at least one of the plurality of outputs and a controller adapted to control the plurality of controllable switches, wherein the controller is configured to detect a loss of primary power and to control the plurality of controllable switches based on a categorization of the plurality of loads as delayable or non-delayable.

The system may include a third input to receive power from a second back-up source, wherein the third input is coupled to at least one of the plurality of controllable switches. The controller may be further adapted to control the plurality of switches to allocate back-up power to the non-delayable loads before allocating power to the delayable loads. The controller may be adapted to detect an overload condition after a loss of primary power and to control one of the plurality of switches to terminate power to one of the delayable loads. The controller may be further adapted to monitor the plurality of loads and to dynamically allocate back-up power to the delayable loads without diverting power from any non-delayable loads. The controller may be adapted to characterize each load in terms of peak power and steady-state power, and to allocate power to each of the plurality of loads based on the peak power and the steady-state power of each load. The system may be configured to couple to a generator at the second input and to a UPS at the third input and the controller may be configured to categorize at least one of the loads as a UPS only load and to couple the UPS only load to the third input to receive power from the UPS after a loss of primary power. The system may further include a control output coupled to the controller, and the controller may be configured to provide output commands at the control output to control a generator. The system may include an input coupled to the controller to receive an input from a generator to allow the controller to monitor at least one parameter of the generator. The system may further include a communications output coupled to the controller, and the controller may be configured to provide status of the system at the communications output to allow a remote user to monitor the system. The controller may be further adapted to receive a load type for each of the plurality of loads, and to categorize each load as delayable or non-delayable based on the load type. The controller may be further adapted to receive an input from a user to modify a categorization of at least one of the plurality of loads. The controller may be further adapted to set default values for electrical parameters for each load based on the load type. The electrical parameters may include a surge power rating and a steady state power rating. The controller may be adapted to receive an input from a user to change the default values for the electrical parameters. The controller may be adapted to update values of the electrical parameters based on measured values. The controller may be adapted to receive data indicative of power draw by the plurality of loads while the plurality of loads are operating from the primary power source, and the controller may be adapted to provide a recommendation for a back up source based on the power draw. The controller may be further adapted to provide a warning to a user of an existence of an overload condition and to receive an input from a user to change at least one non-delayable load to a delayable load to relieve the overload condition. The controller may be configured to detect an overload condition of the UPS or the generator and to switch at least one load from the UPS to the generator or from the generator to the UPS. The controller may be adapted to contain parameters for the plurality of loads and to modify the parameters based on at least one of seasonal changes and inputs from a user.

Another aspect of the invention is directed to a system for controlling back-up power to a plurality of loads, the plurality of loads including a first group of loads categorized as delayable loads and a second group of loads categorized as non-delayable loads. The system includes a first input to receive power from a primary power source, a second input to receive power from a first back-up power source, a plurality of outputs to provide power to the plurality of loads, and means for controlling the system upon loss of primary power to allocate the back-up power such that non-delayable loads will be powered before delayable loads.

The system may further include means for detecting an overload condition and for terminating power to at least one delayable load to correct the overload condition. The system may further include means for determining steady state power and peak power for each of the plurality of loads and allocating back-up power based on the steady state power and peak power determined for each of the loads. At least one of the plurality of loads may be categorized as a UPS only load, and the system may further include a third input to receive power from a UPS and means for coupling the UPS only load to the third input to receive power from the UPS after a loss of primary power. The system may include means for controlling a generator coupled to the second input and means for monitoring the generator. The means for controlling may include means for starting and stopping the generator. The system may further include means for allowing a remote user to monitor and control the system. The system may also include means for monitoring power draw by the plurality of loads while operating on primary power, and means for recommending a back-up power source based on the power draw. The means for controlling the system may include means for dynamically allocating power to the loads to maximize power draw from the back-up source in a back-up mode without exceeding an output capacity of the back-up source.

Yet another aspect of the invention is directed to a system for controlling power to a plurality of loads from a power source. The system includes a first input to receive power from the power source, a plurality of outputs to provide output power to the plurality of loads, a circuit that selectively couples the first input to one or more of the plurality of outputs, and a controller adapted to control the circuit to selectively provide power to the plurality of loads, wherein the controller is configured to control the circuit based on available power from the power source and based on a categorization of the plurality of loads as delayable or non-delayable.

In the system, the controller may be adapted to control the circuit to maximize use of the available power, and the controller may be adapted to disconnect one load of the delayable loads upon detection of an overload condition.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
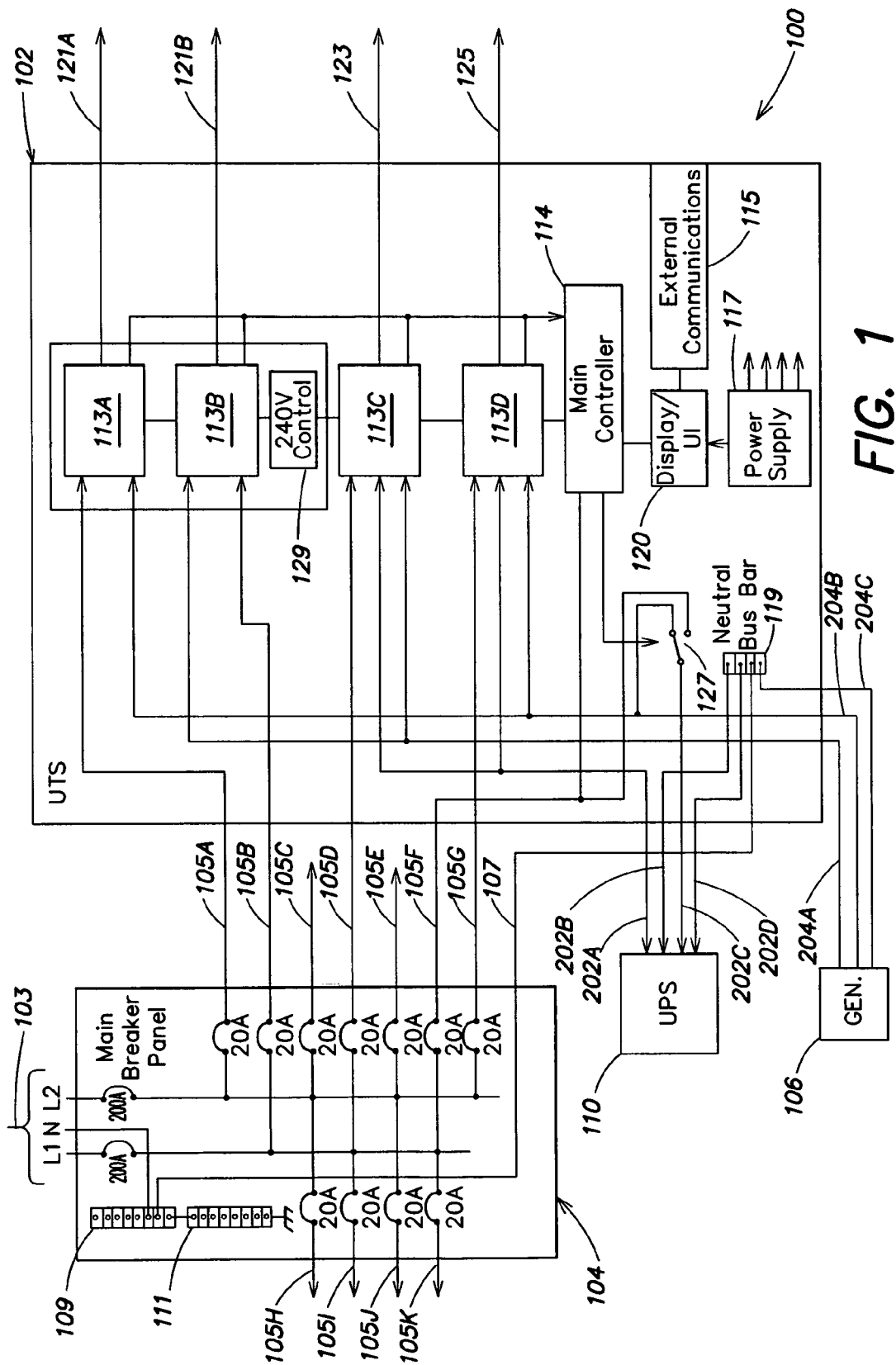
FIG. 1 is a schematic block diagram of one embodiment of an adaptive load control system and transfer switch according to aspects of the invention.

Various embodiments and aspects thereof will now be discussed in detail with reference to the accompanying drawings. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least one embodiment of the present invention is directed to a system that allows a home or small building to use more than one alternate, independent source of electrical energy safely, efficiently and reliably. The system enables the primary power source to be safely disconnected from the alternate source(s), allowing safe and efficient switching between the primary power source and alternate power sources. It is to be appreciated that the term "home" as used herein refers not only to residential houses, apartments or condominiums, but also to multi-unit buildings, small commercial buildings and other small buildings that may use a back-up generator to supply back-up electrical power. In addition, the primary source of energy for the home will be referred to primarily as the main utility power. However, it is to be appreciated that the primary energy source may be other than utility power, for example, a generator or a solar power system and is not limited to being utility power. The alternate energy source(s) can be, for example, a generator, a UPS or battery powered inverter, a solar inverter, a fuel cell, or any other type of power supply.

Further, at least one embodiment, in addition to providing efficient use of backup power, can provide intelligent load control in facilities that do not have backup power. For example, a primary power source may have a limited power capability, and methods and systems of at least some embodiments of the invention can be used to manage the loads to provide the effect of a higher primary source power capability. In addition, these embodiments may be used to achieve load leveling to reduce, for example, load demand during peak times to reduce utility power costs. The peak load on the utility source may be smoothed out by distributing peak loads between primary and backup sources, and/or delaying application of power to some loads that are categorized as "delayable."

According to one embodiment, a power management system and method automatically controls loads and power sources to allow a maximum number of loads to be powered without overloading an alternate power source or sources, which are typically of lower capacity than the primary source. In addition, the system and method may allow maximum runtime of the alternate source, in case where the alternate source is a storage element, for example, a battery, by controlling the number of loads connected to the source and the duration for which the loads are connected to the source. The system and method according to various embodiments of the invention maximizes usefulness and functionality of the alternate source while minimizing inconveniences so as to maintain availability of essential home/office appliances and lifestyle choices.

Referring to FIG. 1, there is illustrated one embodiment of a power management system 100 according to aspects of the invention. The system 100 includes a universal transfer switch (UTS) 102, a main breaker panel 104, a generator 106, and an uninterruptible power supply 110. The UTS 102 receives input power from select circuit branches of the main breaker panel 104, receives input power from the generator 106 and the UPS 110 and provides output power at output circuit branches 121A, 121B, 123 and 125. In the embodiment shown in FIG. 1, output circuit branches 121A and 121B are configured as a pair to provide a 240 volt line-to-line output, while output branches 123 and 125 are configured as 120 volt output circuit branches. In the embodiment shown in FIG. 1, the 240 volt output (at branches 121A and 121B) may be provided from either the generator or the main breaker panel, while the circuit branches 123 and 125 may be powered from the generator, from the main breaker panel, or from the UPS.

The main breaker panel 104 may be the primary breaker panel in a building, such as a residence, or may be a subpanel that receives power from a primary breaker panel. The main breaker panel 104 receives input power from input power lines 103 and provides output power at output lines 105A-105K. In the configuration of system 100 shown in FIG. 1, five output power lines 105A, 105B, 105D, 105F and 105G are coupled to the UTS 102, with two of the power lines 105A and 105B being provided in a 240 volt line-to-line configuration. As shown in FIG. 1, in the system 100, not all of the output power lines of the main breaker panel are coupled to the UTS 102. However, in other embodiments, more or less of the output power lines of a breaker panel may be coupled to a universal transfer switch, and may be configured as 240 volt lines, 120 volt lines, single phase or three phase or in some other manner depending on a particular application. Further, the UTS may also be implemented for international use with other voltages and for use with 50 Hz power systems, DC power systems and other power systems. The main breaker panel 104 also includes a neutral bus bar 109 and a ground bus bar 111. In system 100, the neutral bus bar 109 is coupled to the UTS through an output line 107.

The universal transfer switch (UTS) 102 includes relay circuits 113A, 113B, 113C and 113D, a main controller 114, an external communications module 115, a power supply 117, a neutral bus bar 119, a display/user interface 120, a relay 127, and 240 volt control circuitry 129. The main controller provides overall control of the UTS 102, and in one embodiment includes a microcontroller available from ST Microelectronics of Geneva, Switzerland, under part no. ST72F321, although other microcontrollers may be used. The main controller is coupled to the input and output power lines to monitor status of all of the power lines. The main controller is also coupled to relays 113A-113D, control circuitry 129, and the relay 127, and controls each of these based on settings of the UTS and the status of power from the different sources. The display/user interface 120 is also coupled to the main controller to allow user commands to be communicated to the main controller and to allow status and settings of the UTS to be communicated to a user. In one embodiment, the display/user interface is implemented using another ST Microelectronics microcontroller, part no, ST72F324, although other microcontrollers may be used.

The external communications module 115 is coupled to the display/user interface 120 and may also couple directly to the main controller 116. In different embodiments, external controllers, displays and other devices may couple to the UTS through the external communications module to allow external monitoring and control. The external control may be provided using devices that are coupled directly to the UTS or over one or more known networks. When an external controller is used, it may also be coupled through, for example, a network to the UPS and/or the generator to provide centralized and/or remote control of the system 100. The UTS may also contain a display and/or one or more user interface devices, such as buttons to allow a user to monitor and control settings of the UTS.

The relay 127, under control of the main controller 114, is used to couple the UPS to either the output power lines from the main breaker panel 103 or to output power lines from the generator 106 to provide input power to the UPS on line 202C. The power supply 117 of the UTS is used to provide power to internal components of the UTS, and in one embodiment, may provide DC and/or AC power to external components, such as a backup battery, a generator battery or a remote control monitoring unit.

Figure 2:
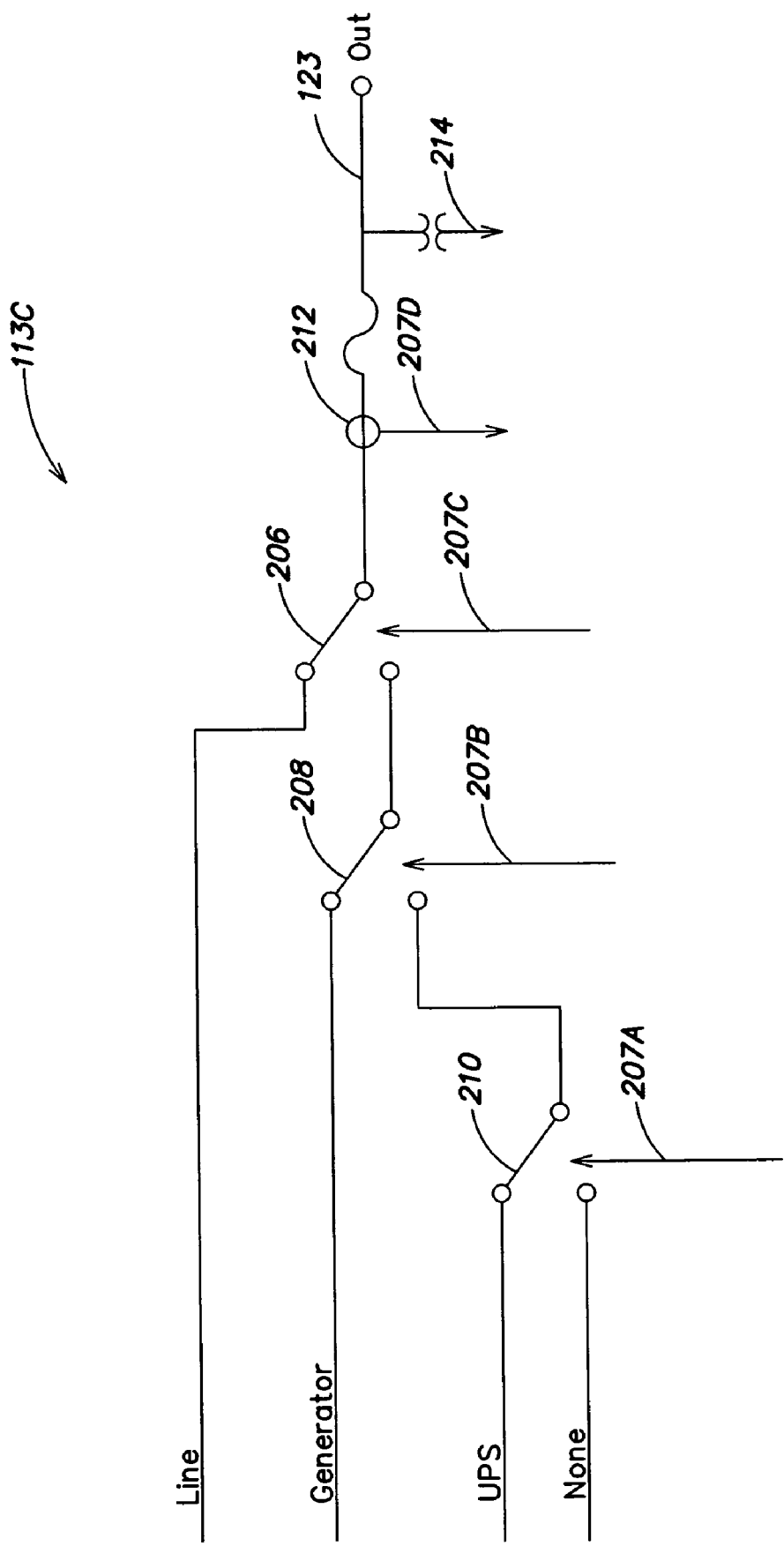
FIG. 2 is a diagram of switch connections between power sources according to aspects of one embodiment of the invention.

The relay circuits 113A-113D are used, under the control of the main controller 114, to switch sources of AC power to the output circuit branches 121A, 121B, 123 and 125. According to one embodiment, the UTS may include for each circuit to be backed up a relay circuit that includes a configuration of relays. FIG. 2 shows one of the relay circuits 113C in greater detail. The relay circuit 113C is coupled to three sources labeled line, UPS and generator. However, the three sources may be any sources of power, AC or DC, and are not limited specifically to a utility line, UPS and generator. Examples of alternate power sources could include solar power devices, windmills, hydrogen sources (e.g., fuel cells), battery-based inverter, and the like. In addition there could be more than three total sources, for example, in a system that has utility, solar, generator & UPS power sources. It is further to be appreciated that the relay configuration shown is illustrative only and that there may be others that provide similar functionality and/or additional features, etc. The circuit 113C includes switches 206, 208, 210, a current sensing device 212 and a voltage sensing device 214. The switches 206, 208 and 210 may be controlled using control lines 207A, 207B and 207C (for example, by controller 114 in FIG. 1) to connect and disconnect the line, UPS and generator sources as needed. In one embodiment, the switches are implemented using for example, a form 1C relay, such as that available from Song Chuan of Taipei, Taiwan, part no. 832A-1C-S, although other devices could be used. The current sensing device 212 and the voltage sensing device 214 may be coupled to the controller 114 using sense lines 209 and 214.

In the embodiment shown in FIG. 1, relay circuits 113C and 113D are similar devices that switch one of three input sources to an output. Relay circuits 113A and 113B are similar to circuit 113C except that relay circuits 113A and 113B are not coupled to the UPS. In the embodiment shown, the output of circuits 113A and 113B are combined to provide a 240 volt output. In embodiments using a split-phase output UPS system, the UPS may be coupled to each of circuits 113A and 113B. The 240 volt control circuitry 129 is coupled to relay circuits 113A and 113B and the main controller to provide additional means of preventing backfeed from an alternate source to the input power lines In the system 100, the generator 106 is connected to the UTS 102 via power lines 204A, 204B and 204C with lines 204A and 204B being input phase lines and 204C being a neutral line. In addition, the generator may have control signals coupled to the UTS to allow the UTS to remotely start and stop the generator, and monitor status of generator parameters, such as fuel level, oil level, temperature, and the like. Further, power for charging of a battery of the generator may be provided from the UTS using charging connections (not shown). In one embodiment, the generator may be implemented using a Craftsman 3600 W generator available from Sears Roebuck of Chicago, Ill., however, other generators may be used as well with embodiments of the invention. The uninterruptible power supply (UPS) 110 is coupled to the UTS 102 over lines 202A, 202B, 202C and 202D. Two of the lines 202A and 202B provide power from the UPS and two of the lines 202C and 202D provide power to the UPS. In addition, communication lines may be connected between the UTS and the UPS to allow the UPS 110 to communicate with the UTS 102, for example, using proprietary communication protocols or one of a number of known protocols. In one embodiment, the UPS may be implemented using a Smart-UPS 1500 UPS available from American Power Conversion Corporation, of West Kingston, R.I. Ratings and power capabilities of the generator 106 and the UPS 110 may be selected according to expected power needs.

Embodiments of the present invention provide automatic prevention of generator and UPS overloads and automatic load control without setting a complicated hierarchy of priorities. The system takes advantage of a UPS as an alternate and/or additional source of power for peak-shaving while providing true uninterrupted power for sensitive loads. The UPS 110 may be used to limit unnecessary generator operation by powering loads through short duration outages, thereby maximizing generator life and minimizing fuel consumption, environmental concerns, noise, and the like.

Figure 3:
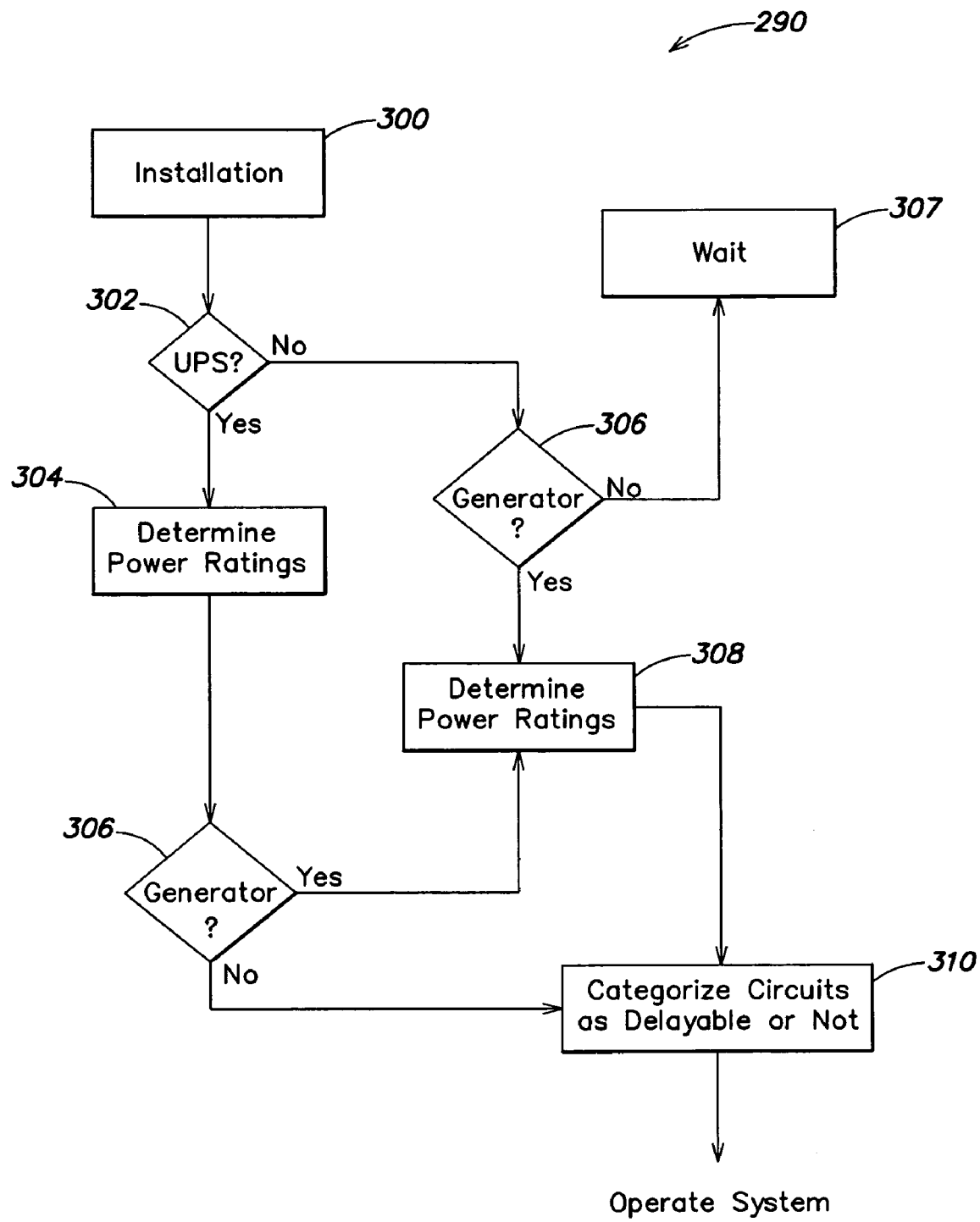
FIG. 3 is a flow diagram of one embodiment of an initial configuration procedure.

Referring to FIG. 3, there is illustrated a flow diagram of one embodiment of a process 290 for power management in a home or other building using a system, such as that described above. After initial installation (300) of the system, for example, by a qualified electrician, is complete, the installer may be asked some questions about the system. First, (block 302), it is to be determined whether a UPS (or inverter) is available for use in the system. If a UPS is available, its power ratings, for example, surge power capability and continuous output power in Watts, are determined (block 304). Next, a determination is made as to whether a back-up generator is available for use in the system (block 306), and again, if there is an available generator, its power ratings should also be determined (block 308). If neither a UPS nor a generator is in the system, the UTS may still proceed (although it would not offer any transfer functionality), and may make recommendations on the proper size of generator and/or UPS for the system, based on real-time data (e.g. peak and average power) about the loads collected by the UTS. The portions of the process described above 302-308 may then be repeated once a UPS and/or generator is connected to the system. In the example of FIG. 3, if neither a generator or UPS is available, the process 290 may wait at block 307 until either a UPS or generator is available.

In one example, either (or both) the generator or the UPS may have advanced communications features that provide the information for the questions in blocks 302-308 automatically. In addition, advanced communication features may also provide additional functionality, as discussed below. Suitable derating of overload ratings may be implemented by default to provide safety margins.

Next in the process, at block 310, the installer or homeowner may be asked to label each circuit in the system, for example, in a way similar to the way in which circuits are labeled in main breaker panels. For example, it may be determined what is the main load on the circuit that will be most often used in a blackout, such as, a furnace, refrigerator, sump pump, garage door opener, microwave, computer/home network, TV/home theater, fish tank, lighting or other circuit. In addition, it may be determined which circuits may be capable of sustaining or enduring a temporary power loss and which circuits are not. Based on this determination, each circuit in the system may be categorized internally by the UTS as "delayable" or "not delayable." It is to be understood that for the purposes of this disclosure, "delayable" means that the power to the circuit can be temporarily cut off (interrupted) as needed (to handle overloads for example) and restored at a later time. "Not delayable" means that power to the circuit should not normally be interrupted, whereas "delayable" circuits would normally be for loads such as furnaces and refrigerators that are tolerant of a temporary loss of power. Not delayable circuits would normally be for loads such as computers, microwave ovens and garage door openers where even a momentary loss of power could result in data loss, inconvenience or worse. It is to be appreciated that "not delayable" does not necessarily mean "essential." Rather, a not delayable circuit is one that, when a user initiates operation of a device coupled to the circuit, it is expected that the device will operate and not temporarily lose power. A delayable circuit, such as a furnace, may be a circuit that normally cycles on and off on its own and thus is not adversely affected by a temporary loss of power. Also, if the system is configured such that there is too much load on the "not delayable" circuits to provide power to the "delayable" circuits in a reasonable amount of time, the user/homeowner may be warned and notified of possible changes to the configuration that may alleviate the problem.

Referring to Table 1 below, there is given one example of classification of several exemplary circuits in one embodiment of a system according to the invention. The table illustrates that power needs of each circuit may be recorded (manually by the installer/operator or automatically by the UTS controller) to assist the controller in choosing which circuits to add or drop to the generator/UPS in the event of a power failure. This set-up system of characterizing circuits in terms of "delayable" or "non-delayable" is simple and intuitive and does not require the user to determine a complex priority scheme for the circuits. This is a significant advantage over conventional systems.

TABLE 1

| Circuit | Delayable? |
| --- | --- |
| Furnace | Yes |
| Microwave | No |

TABLE 1-continued

| Circuit | Delayable? |
| --- | --- |
| Sump pump | Yes |
| Well pump | Yes |
| Refrigerator/freezer | Yes |
| Lights | No |
| Computer/home network | No |
| TV/entertainment center/home theatre | No |
| Air conditioner | Yes |
| Garage door opener | No |
| other | No |

In one embodiment of the invention, for each delayable circuit, a maximum amount of time that power to the circuit can be delayed may be programmed into the system. This can be useful for loads that can tolerate a temporary loss of power, but will cause severe problems if blackout is prolonged. For example, if a well pump is without power for too long, the water tank may empty and have to be re-primed manually. Basement flooding may result if a sump pump is without power for too long. To handle gracefully such situations, the system may include default settings for maximum delay times and/or the settings may be input by a user.

In one embodiment, when the maximum delay time has been reached, that circuit will be powered at the expense of another delayable circuit. For example, during a prolonged blackout, the generator is powering the furnace (as the only delayable load) as well as other non-delayable loads through the UTS. The UTS has determined that there is currently insufficient reserve power to supply the well-pump, but a counter is keeping track of how long power has been disconnected from the well-pump. When the maximum delay time of the well pump (e.g. 30 minutes) is reached, the UTS will disconnect the furnace (since it is the only delayable load currently being powered), even if it is currently running, and supply power to the well-pump instead. At this time, the maximum delay timer for the furnace (if it has been configured with one) will be started (and the maximum delay timer of the well-pump is reset to zero). If the well pump continues to consume power until the timer for the furnace reaches its maximum delay time, the UTS will disconnect the well-pump's circuit in order to connect the furnace. If the well pump stops consuming power, for instance because the water tank fills up, then the system will have spare capacity, which will allow the UTS to connect the furnace in addition to the well pump.

In another embodiment of this maximum delayable time feature, this timer may be used to determine which circuit to re-connect when there is spare capacity available for the alternate source. As described previously, the default action in similar circumstances would be to connect the load that maximizes the output power of the generator without overloading it. However, if one of the loads has exceeded its maximum delay time, then it will be powered (even if powering another load would have resulted in greater utilization of generator output power.) This feature allows for more flexibility and intelligence in directing backup power to those loads that need it the most, but without necessarily interrupting power to loads that are currently operating.

Figure 4:
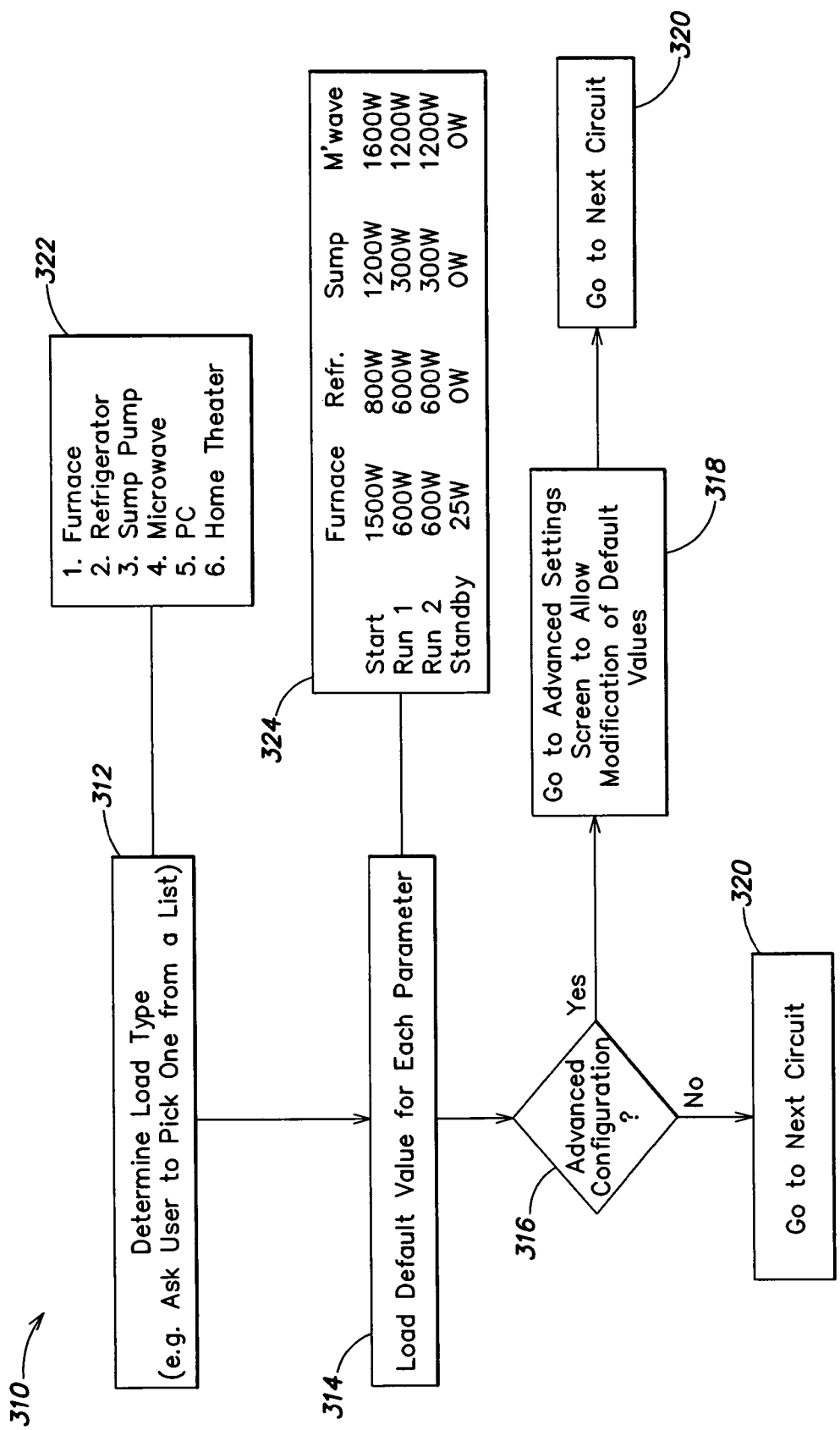
FIG. 4 is a flow diagram showing further detail of an installation process used in the process of FIG. 3 for each circuit.
Figure 5:
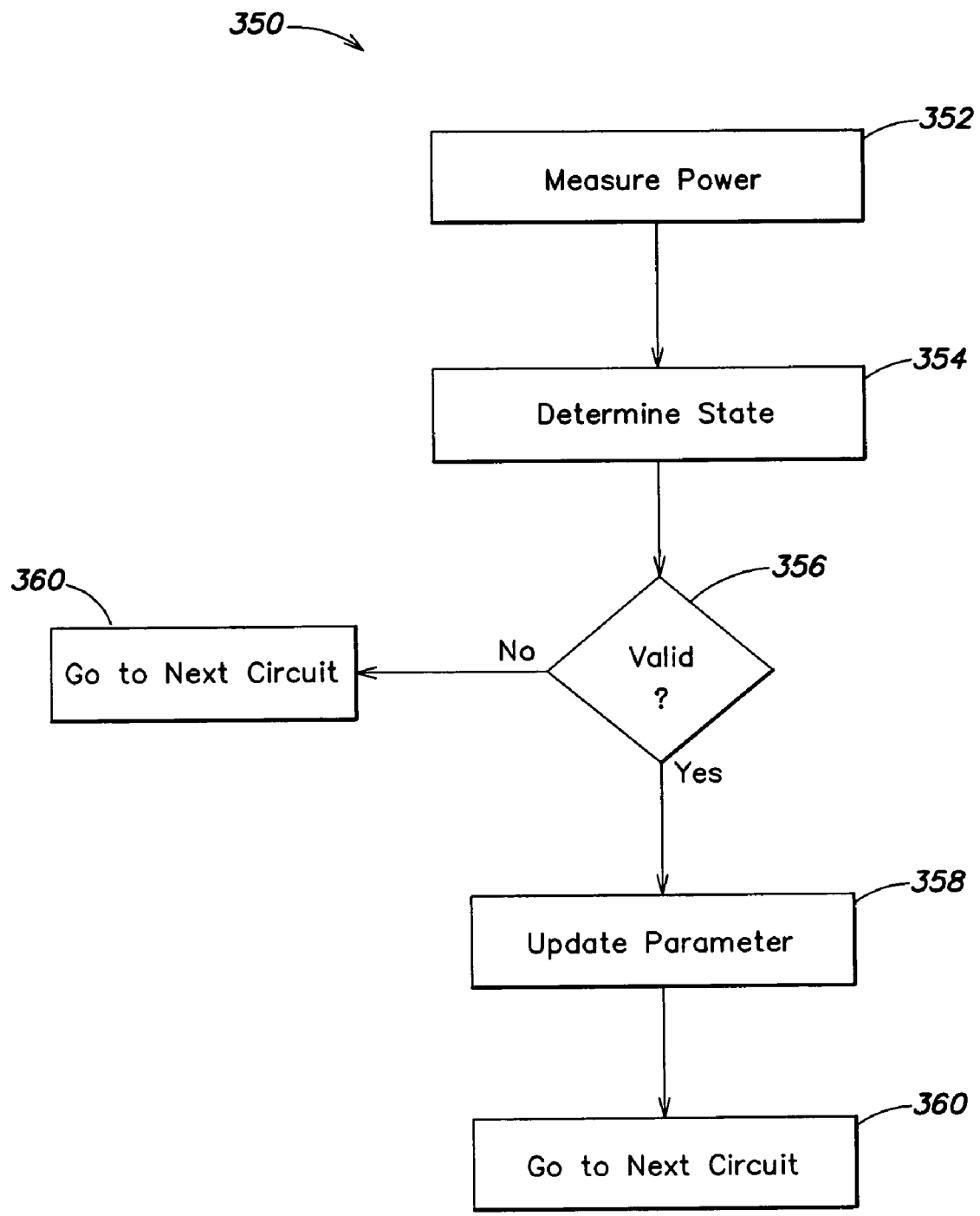
FIG. 5 is a flow diagram of a process used in one embodiment to update parameters of loads based on actual measured data during operation.

In addition to characterizing each of the circuits as delayable or non-delayable based on the load coupled to the circuit, in one embodiment, which will now be described with reference to FIG. 4, additional electrical parameters may be stored for each of the circuits of the UTS. FIG. 4 includes a flowchart describing in further detail the categorization of circuits in stage 310 of process 290. First, at stage 312, a user is asked to identify the load type to be connected to each of the circuits. Informational block 322 provides examples of various load types. Next, at stage 314, the system will set default settings for electrical parameters for the loads identified at stage 312. The electrical parameters may include current and/or power for different operating modes of the load, as shown, for example, in information block 324. In the embodiment shown in FIG. 4, the default settings may be overridden by a user/operator by selecting an advanced configuration option at stage 316. In addition, the characterization of a load as delayable or non-delayable may be set be a user. Upon selection of the advanced configuration option, the user is presented with a screen (318) that allows modification of the default values that were set at stage 314. After modification of the default values, or if the user decides not to modify the default values, the process shown in FIG. 4 is repeated for the next circuit (320). In some embodiments, the default settings may include a value of zero for current and/or power, if this is the most appropriate setting. The process described with reference to FIG. 4 may also be initiated by a user when a device powered by the UTS is replaced, for example, when a user's furnace is replaced. Alternatively, when a replacement device is installed, the process described with reference to FIG. 5 below may be used to adjust stored electrical parameters for the furnace.

In one embodiment of the invention, the values for the electrical parameters that are set in accordance with the process of FIG. 4 may be augmented by actual measured data for each of the circuits obtained during normal operation. The use of default settings and updates based on actual values allows the system to operate with accurate, up-to-date information without requiring complicated configuration procedures. A process 350 for updating electrical parameters during operation will now be described with reference to FIG. 5, which shows a flowchart of the process. At an initial stage 352, the power is measured for a first circuit. Based on the power measured, the system at stage 354 determines the operational state of the load by comparing the measured power with the power entered in stage 310 for each operational state for the load coupled to the first circuit. If there is no match, the system will determine the state by selecting the state whose power is closest to that measured. At decision block 356, the system determines whether the set power value for the circuit is valid. In one embodiment, a valid reading is one that is within ten percent of the set value. However, threshold levels other than ten percent may also be used. If the measured value is not valid, then at stage 360, the process proceeds with the next circuit. The user may be notified of an invalid reading to determine if there is an error in the system. If the reading is valid, then in stage 358, the stored value will be replaced with the measured value. After updating the value, or if the set value is not valid, process 350 continues with the next circuit (360). Using the above process, the system is able to adapt to real-time power changes when, for example, a load, such as a furnace, is replaced or upgraded.

In a system where both a UPS and a generator are part of the system, the information stored for each circuit may include whether the load coupled to the circuit may be powered by the generator only, the UPS only, or by either the generator or the UPS. This information may be used, for example, to prevent sensitive equipment such as PCs & home electronics from being potentially damaged by a noisy, poorly regulated output of a generator. Information regarding a load's ability to operate from one or both a generator and UPS may be one of the default settings set by the system based on the load type. This default setting, like others described above, may be overridden by the user/operator.

The system and methods of the invention may provide adaptive, dynamic selection of which loads to power based on real time data and actual load behavior. Within the "delayable" group, loads (circuits) may still be disconnected to prevent overloads and reconnected when the generator has spare capacity. However the decision as to which load to disconnect may not necessarily be pre-set (as in systems where loads are classified based on a hierarchy of "essentialness"), rather load-balancing may be dynamically determined, for example by characterizing each circuit's peak and steady state power draw, and comparing against the capabilities of the alternate source(s), e.g. generator and UPS.

Figure 6:
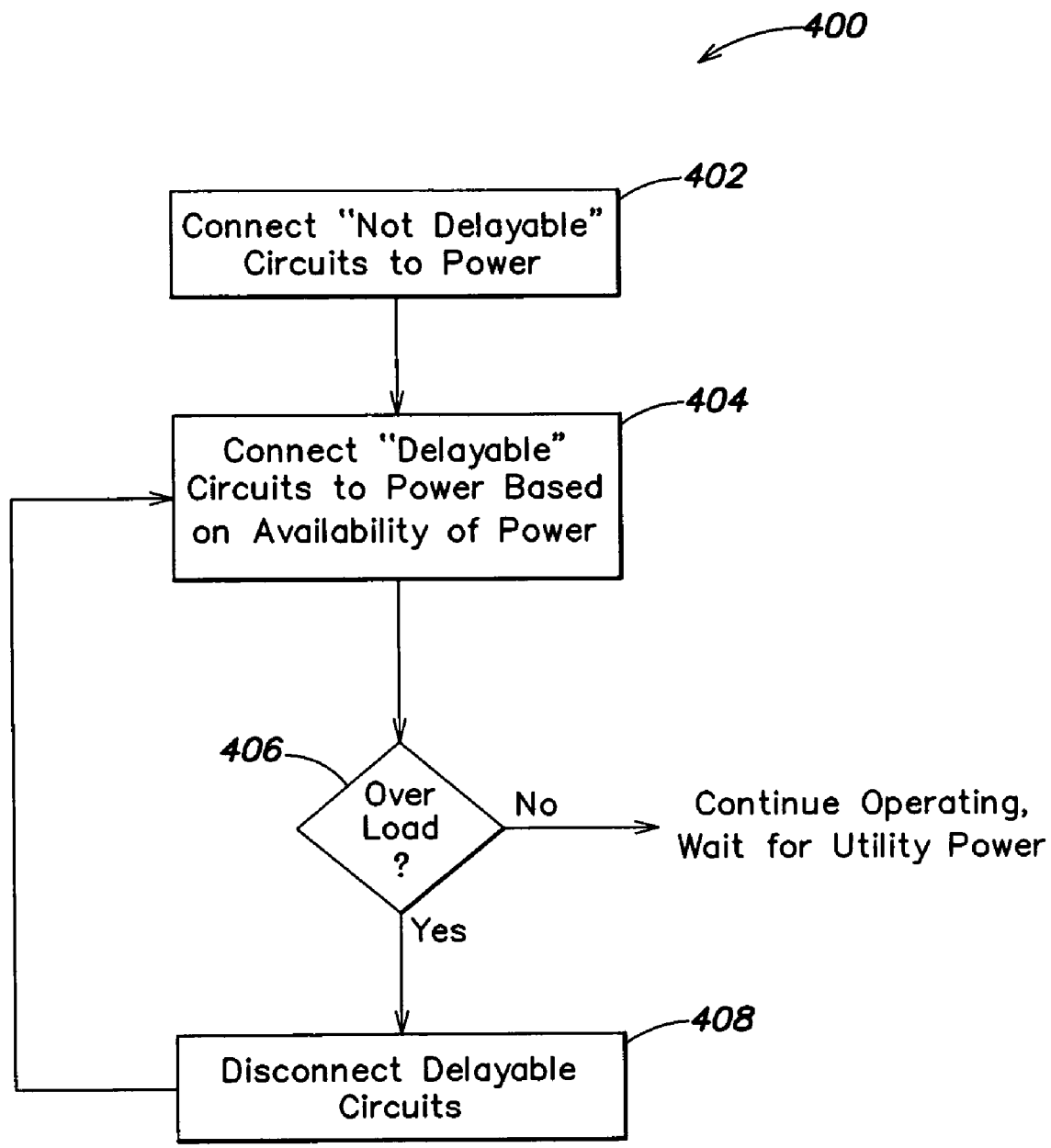
FIG. 6 is a flow diagram of an embodiment of a load control algorithm.

In one embodiment, referring to FIG. 6, in a system with a generator or a UPS only, a process 400 for operation of the system during a power failure may operate as follows. In a first part of the process (stage 402), any circuits categorized as "not delayable" may be connected first to the available power source, followed by any circuits categorized as "delayable" (stage 404). If, at any time, the system detects (stage 406) that an overload condition (as defined by a power consumption in excess of the provided continuous or surge ratings provided for the generator or UPS) exists, then one or more of the "delayable" circuits may be dropped (stage 408). In one embodiment, to determine if an overload may exist, the instantaneous current supplied by the backup source is measured, and from this measurement, first a determination is made as to whether the current surge rating of the backup source is exceeded. If so, one or more delayable loads are disconnected to result in the maximum load possible within the surge rating of the source. Next, an average current draw from the source is determined by measuring the instantaneous current over a period of time. In one embodiment, a current measurement is made thirty two times per line cycle to determine the average current. If the average current draw exceeds the continuous current rating of the source, then one or more delayable loads are disconnected to result in the maximum load possible within the current rating of the source.

According to one embodiment, the choice of which delayable circuit to drop may be based on any or all of following criteria: Which circuit(s), when dropped, will clear the overload while resulting in the maximum amount of power being delivered to all remaining circuits; which circuit has "asked" for the power, i.e. the circuit that triggered the overload.

According to one example, when the overload condition has been cleared, and sufficient power budget exists to reconnect the dropped circuit(s), then reconnecting the dropped circuits may be based on the following criteria: Maximizing the load on the generator while minimizing the likelihood that the circuit, when reconnected, will not trigger another overload; and which circuit has been disconnected for the longest time. In most circumstances, these criteria may be adequate to pick the correct circuit for connection/disconnection. However if there are still two or more circuits that may be dropped (or reconnected), the "tie-breaker" may be based on other dynamic factors such as: The duration that the circuit has been connected or disconnected (i.e. its place in the "queue"); the amount of energy delivered to the circuit (e.g. watt-hours) in the last power cycle (e.g. standby-start-run-standby); and the anticipated remaining time that the circuit is expected to draw power (based upon it's typical power consumption profile).

According to another embodiment, an algorithm may be provided for load control in a system having both a UPS and a generator. In a first step, if both generator and UPS power are available, one or more of the circuits in the system may be labeled as "UPS only" (i.e., to be powered by the UPS). The remaining circuits may be powered by the UPS if sufficient additional UPS power is available, or by the generator. The determination of which circuits should be categorized as "UPS only" may be based on a circuit's sensitivity to temporary loss of power or to quality of power. For example, extremely sensitive circuits that should be protected from even momentary power loss may be categorized as UPS-only. The decisions on which loads to connect or drop may be based on the criteria given above, however, these criteria may be applied only to those circuits connected to either UPS or generator. The "UPS-only" circuits may not be dropped from the UPS or connected to the generator unless a power-decision needs to be made among all the UPS-only circuits, for example, if the UPS can no longer provide power to all the UPS-only circuits. If only generator power is available (e.g. the UPS batteries have run down), or if only UPS power is available (i.e. the generator has not started yet) then the system may behave as it does in the example described above with only a single source.

Thus, the system may provide the ability to designate each circuit to be used exclusively with one alternate source. For example, a circuit that powers sensitive home electronics (computers, home theater) may be designated as "UPS only", so that the poor quality power & surges from a low cost home generator cannot damage the loads. As another example, a load such as a microwave may be designated "generator only" so that power is available to the microwave only once the generator is started.

According to another embodiment, if a power surge exceeds the rating of the generator, then the UTS may switch circuits to the UPS momentarily to provide greater total surge power capability. Of those circuits labeled as either UPS or generator, those that will not overload the UPS may be selected, based on similar criteria as described above. In another example, a circuit may be transferred temporarily from the UPS to the generator to prevent UPS overloads, as long as that circuit was not designated UPS only. It is to be understood that in a system with a UPS, one mode of operation may be "maximum runtime," wherein only the "not delayable" circuits may be powered until the generator (if available) comes on line. There may be additional options for increasing the runtime of the UPS, such as dropping all "delayable" and/or certain "not delayable" circuits when UPS batteries are running low. Embodiments of the invention may provide maximum benefit when both a generator and a UPS are available, leveraging the strengths and minimizing the deficiencies of each source. Embodiments of the present invention may be able to maximize the usefulness of an alternate power source automatically without unnecessary load shedding. Embodiments of the invention offer the additional advantage of enabling an operator to easily change UTS modes after installation, for example to account for seasonal adjustments, the addition of a second alternate power source, or to take advantage of lower cost energy.

The presence of a UPS may be detected (manually or automatically) and become a factor in the decision of whether or not to disconnect any particular load. For example, during a peak inrush event (as in starting a large motor load), one of the "not delayable" circuits already connected to the generator (e.g. a PC) could be temporarily transferred to a UPS to prevent a power spike from affecting the circuit (e.g., causing the PC to reboot) or to prevent generator overload. This allows a generator of a lower power rating to perform equivalently to a generator of a higher power rating.

Embodiments of the invention provide a novel method for adaptively controlling power among a selection of circuits, including categorizing these circuits based on whether power to those circuits can be "delayed" or not. The controller in the transfer switch (UTS) then attempts to always keep the "not delayable" group powered by the alternate source in the event of loss of power from the primary source. The "delayable" group of circuits may only be powered if spare power capacity is available. Thus, the system provides adaptive, dynamic selection of which loads to power based on real time data and actual load behavior. Within the "delayable" group, circuits may still be disconnected to prevent overloads and reconnected as necessary. However the decision as to which load to disconnect may not be pre-set, but rather may be dynamically determined, for example, by characterizing each circuit's peak and steady state power draw, and comparing against the capabilities of the alternate source(s), e.g. generator and UPS.

Although this disclosure has primarily discussed a system in which one or two alternate sources are available, the transfer switch of the present invention may be easily adapted to deal with more than one or two alternate sources. For example, it may be possible to have more than two alternate sources and to implement distributed power generation across a number of alternative energy sources. More broadly, this system could deal with a plurality of independent energy sources and distribute it to a plurality of output circuits, with any one output circuit being able to be powered by any of the input sources.

According to another embodiment, the system may also (optionally) be able to notify remotely the user about the status of the UTS or the energy sources. For example, as discussed above, the controller of the UTS may include a remote display unit that may be used to remotely notify the user to, for example, come and start a manual generator in case of an extended blackout. In addition, in embodiments of the invention described above, the UTS is described as containing a controller that is programmed to control the UTS in the modes of operation described above. In other embodiments, the functions of the controller may be implemented in an external controller or computer coupled to the UTS.

According to another embodiment, the system may measure the power draw of individual circuits and determine the appropriate UPS or generator sizing, the likelihood of overloads, estimate runtime (on battery) and make suitable recommendations to the user for optimal performance.

Below are given some specific examples to illustrate several scenarios in which the embodiments of the invention may operate. However it is to be appreciated that embodiments of the invention are not limited to the specific examples described herein, which are given for the purposes of explanation and illustration, and are not intended as a definition of the scope of the invention.

For the following examples, consider a backup system with a UTS and a back-up source rated for 6500 W peak power, 4000 W continuous power. Two loads have been labeled "delayable," a furnace and a refrigerator.

EXAMPLE 1

The source was loaded with 4490 W, consisting of a furnace, PC, refrigerator, microwave, and lights. The UTS recognizes that the load is beyond the continuous rating of the source and takes action. It measures the power being drawn by the two delayable loads as 1800 W by the furnace and 600 W by the refrigerator. The UTS disconnects power to the refrigerator, bringing the total load to 3890 W.

After a few minutes, the microwave turns off, decreasing the total load to 2390 W. The UTS recognizes the extra capacity available and reconnects the refrigerator, which raises the load to 3590 W.

EXAMPLE 2

The source was loaded with 4590 W, consisting of a furnace, PC, lights, and an operating garage door opener. The UTS recognizes that the load is beyond the continuous rating of the source and takes action. Since the furnace is the only delayable load currently drawing power, the UTS disconnects the furnace from the source. When the garage door opener completes its task, the load drops, so the UTS reconnects the furnace.

EXAMPLE 3

The source was loaded with 1190 W, consisting of a PC, refrigerator, and lights. The thermostat toggles on and activates the furnace. The inrush of the furnace creates a surge load of 6590 W. The UTS recognizes the surge rating of the source is being exceeded and takes action. It measures the power being drawn by the two delayable loads as 5400 W by the furnace (due to inrush) and 600 W by the refrigerator. The UTS disconnects power to the refrigerator, bringing the total load to 5990 W, within the surge rating of the generator.

Once the inrush requirement of the furnace is satisfied, the load settles to 2390 W. The UTS reconnects the refrigerator. The surge rating of the source handles the surge load of 4790 W. Once the inrush requirement of the refrigerator is satisfied, the load settles to 2990 W.

EXAMPLE 4

In this example, the system includes a UPS rated for 980 W. There is no published "surge" rating for this particular UPS comparable to that of a generator, so for the purposes of this scenario, max surge & running power are set at 980 W. The generator (for example, a Craftsman 3600 W generator available from Sears) is rated for 5300 W surge.

The load is set up as shown in Table 2 below.

owner. The last three columns are information determined (and continuously updated) during a period of time while all the circuits are operating, normally on primary utility power, but during an extended outage, data from the loads running from an alternate source would enter the calculations. There could be default initial values based on the load type chosen.

Referring to Table 2, the total system load's surge power of 6,900 W is above the surge rating of the generator, as is the total running power of 3,700 W. However excluding the "UPS only" circuits B & D, the total generator power is 3,200 W (surge 5,600 W). The UPS cannot support the surge power rating of circuits A, C & F. The UPS can also back up the UPS only circuits of B & D, but not while load C (garage door) is operating.

According to one embodiment, the system would warn the user of potential overloads and offer the chance to reassign groups or settings to reduce the likelihood of overload.

In Example 4, when a power outage occurs the UPS transfers to battery and immediately starts backing up the "not delayable" circuits A, B, D & E, so that the home network & PC's are not affected at all, and the garage door opener does not get stuck (if it happened to be operating when the power failed). Total standby power is 340 W, well within the rating of the UPS.

While generator power is not available, none of the "delayable" circuits (C or F) are powered because their power ratings (surge and running) would exceed the UPS's ratings (F is generator only anyway). Thirty minutes later, the blackout continues and the homeowner turns on the generator. 15 seconds later, the generator has stabilized and is ready to provide power. Now all circuits that are not UPS only (circuits A, C, E & F) are switched over to the generator, for a standby power of 15 W on the generator and 325 W on the UPS.

Once all circuits are connected, the refrigerator and furnace may attempt to turn on at once (due to the ~30 minutes during which they had no power). This creates a temporary surge power of 3000 W on the generator, within the rating of the generator. No circuits are dropped. The running power soon drops to 1200 W.

Sometime later while the furnace is running, and the refrigerator is starting, for a total power of 2400 W, both the microwave and garage door are turned on at around the same time, for a surge power of 5400 W, which exceeds the surge rating of the generator. The UTS has determined that it is not able to ride through the surge and must disconnect 100 watts of delayable power. This means that C or F must be dropped.

TABLE 2

| Circuit | Load | Delayable? | UPS only? | Generator only? | Surge Power (Watts) | Running Power (Watts) | Standby Power (Watts) |
|---|---|---|---|---|---|---|---|
| A | Microwave | No | No | Yes | 2000 | 1500 | 0 |
| B | Home theatre | No | Yes | No | 600 | 200 | 25 |
| C | Refrigerator | Yes | No | No | 1800 | 600 | 15 |
| D | PC and home network | No | Yes | No | 300 | 300 | 300 |
| E | Garage door opener | No | No | No | 1000 | 500 | 0 |
| F | Furnace | Yes | No | Yes | 1200 | 600 | 0 |

In this example, the first 2 columns are set/labeled at the time of installation by the electrician. The next three columns are set during initial configuration of the UTS by the home- Since dropping the furnace would result in a 600 W reduction of running power (vs. 1800 W of starting power for the refrigerator), the furnace would be the load to drop. In lieu of dropping the furnace, another option available in this system with both UPS & generator is to transfer some load to the UPS. Either the garage door opener or the refrigerator would be available. The furnace is "generator only"; therefore, this option is not available.

The above examples illustrate the adaptability of the system and UTS to various situations. The system of the present invention provides a substitute for manual and/or automatic transfer switches in new or upgraded installations. As discussed above, the system may be primarily used in homes, but may also be used in small businesses and apartment buildings as well.

At least some embodiments of the present invention described above provide methods and systems for providing efficient control of power in a facility. In embodiments described above, a UTS includes one or more controllers that are programmed to provide for efficient control of facility power. In embodiments, functions of the UTS may be implemented in software or hardware, including for example, specially programmed, special-purpose hardware, for example, an application-specific integrated circuit (ASIC). Further, various methods acts and systems described above may be implemented using a general purpose computer system or a distributed computer system programmed to perform the functions described above. Such a computer system may include a computer readable and writeable non-volatile recording medium, such as a disk or flash memory, that store signals which define one or more programs to implement processes of embodiments of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for controlling power to a plurality of loads from a plurality of power sources, wherein at least one of the plurality of power sources is a primary power source and at least one of the power sources is a back-up power source, the system comprising:
a first input to receive power from the primary power source;
a second input to receive power from the back-up power source;
a plurality of outputs to provide output power to the plurality of loads;
a plurality of controllable switches each coupled to the first input, the second input and at least one of the plurality of outputs; and
a controller adapted to control the plurality of controllable switches, wherein the controller is configured to detect a loss of primary power and to control the plurality of controllable switches based on a categorization of the plurality of loads as delayable or non-delayable, and wherein the controller is configured to selectively turn on and off delayable loads based on available power from the back-up power source, and wherein the controller is programmable to set a maximum delay time for each of the delayable loads.

2. The system of claim 1, further comprising a third input to receive power from a second back-up source, and wherein the third input is coupled to at least one of the plurality of controllable switches.

3. The system of claim 1, wherein the controller is further adapted to control the plurality of switches to allocate back-up power to the non-delayable loads before allocating power to the delayable loads.

4. The system of claim 3, wherein the controller is adapted to detect an overload condition after a loss of primary power and to control one of the plurality of switches to terminate power to one of the delayable loads.

5. The system of claim 4, wherein the controller is further adapted to monitor the plurality of loads and to dynamically allocate back-up power to the delayable loads without diverting power from any non-delayable loads.

6. The system of claim 5, wherein the controller is further adapted to characterize each load in terms of peak power and steady-state power, and to allocate power to each of the plurality of loads based on the peak power and the steady-state power of each load.

7. The system of claim 2, wherein the system is configured to couple to a generator at the second input and to a UPS at the third input and the controller is configured to categorize at least one of the loads as a UPS only load and to couple the UPS only load to the third input to receive power from the UPS after a loss of primary power.

8. The system of claim 1, further comprising a control output coupled to the controller, and wherein the controller is configured to provide output commands at the control output to control a generator.

9. The system of claim 1, further comprising an input coupled to the controller to receive an input from a generator to allow the controller to monitor at least one parameter of the generator.

10. The system of claim 8, wherein the output commands includes a command to power down the generator.

11. The system of claim 1, further comprising a communications output coupled to the controller, and wherein the controller is configured to provide status of the system at the communications output to allow a remote user to monitor the system.

12. The system of claim 1, wherein the controller is further adapted to receive a load type for each of the plurality of loads, and to categorize each load as delayable or non-delayable based on the load type.

13. The system of claim 12, wherein the controller is further adapted to receive an input from a user to modify a categorization of at least one of the plurality of loads.

14. The system of claim 1, wherein the controller is further adapted to receive a load type for each of the plurality of loads, and wherein the controller is further adapted to set default values for electrical parameters for each load based on the load type.

15. The system of claim 14, wherein the electrical parameters include a surge power rating and a steady state power rating.

16. The system of claim 14, wherein the controller is adapted to receive an input from a user to change the default values for the electrical parameters.

17. The system of claim 14, wherein the controller is adapted to update values of the electrical parameters based on measured values.

18. A system for controlling power to a plurality of loads from a plurality of power sources, wherein at least one of the plurality of power sources is a primary power source and at least one of the power sources is a back-up power source, the system comprising:
a first input to receive power from the primary power source;

a second input to receive power from the back-up power source;

a plurality of outputs to provide output power to the plurality of loads;

a plurality of controllable switches each coupled to the first input, the second input and at least one of the plurality of outputs; and a controller adapted to control the plurality of controllable switches, wherein the controller is configured to detect a loss of primary power and to control the plurality of controllable switches based on a categorization of the plurality of loads as delayable or non-delayable, and wherein the controller is configured to selectively turn on and off delayable loads based on available power from the back-up power source;

wherein the controller is adapted to receive data indicative of power draw by each of the plurality of loads while the plurality of loads are operating from the primary power source, and wherein the controller is adapted to provide a recommendation for a proper type for a back up source for each of the plurality of loads based on the power draw.

19. The system of claim 8, wherein the output commands include a command to power up the generator.

20. The system of claim 4, wherein the controller is further adapted to provide a warning to a user of an existence of an overload condition and to receive an input from a user to change at least one non-delayable load to a delayable load to relieve the overload condition.

21. The system of claim 2, wherein the system is configured to couple to a generator at the second input and to a UPS at the third input and the controller is configured to detect an overload condition of the UPS and to switch at least one load from the UPS to the generator.

22. The system of claim 2, wherein the system is configured to couple to a generator at the second input and to a UPS at the third input and the controller is configured to detect an overload condition of the generator and to switch at least one load from the generator to the UPS.

23. The system of claim 1, wherein the controller is adapted to contain parameters for the plurality of loads and to modify the parameters based on at least one of seasonal changes and inputs from a user.

24. A system for controlling back-up power to a plurality of loads, the plurality of loads including a first group of loads categorized as delayable loads and a second group of loads categorized as non-delayable loads, the system comprising:

a first input to receive power from a primary power source;

a second input to receive power from a first back-up power source;

a plurality of outputs to provide power to the plurality of loads; and means for controlling the system upon loss of primary power to allocate the back-up power such that non-delayable loads will be powered before delayable loads, including means for selectively turning on and off delayable loads based on available power from the back-up power source, and including means for setting a maximum delay time for each of the delayable loads.

25. The system of claim 24, further comprising means for detecting an overload condition and for terminating power to at least one delayable load to correct the overload condition.

26. The system of claim 25, further comprising means for determining steady state power and peak power for each of the plurality of loads and allocating back-up power based on the steady state power and peak power determined for each of the loads.

27. The system of claim 24, wherein at least one of the plurality of loads is categorized as a UPS only load, and wherein the system further comprises a third input to receive power from a UPS and means for coupling the UPS only load to the third input to receive power from the UPS after a loss of primary power.

28. The system of claim 24, further comprising means for controlling a generator coupled to the second input.

29. The system of claim 24, further comprising means for monitoring a generator coupled to the second input.

30. The system of claim 28, wherein the means for controlling the generator include means for issuing a start command to start the generator upon loss of primary power.

31. The system of claim 28, wherein the means for controlling the generator include means for issuing a stop command to stop the generator.

32. The system of claim 24, further comprising means for allowing a remote user to monitor and control the system.

33. A system for controlling back-up power to a plurality of loads, the plurality of loads including a first group of loads categorized as delayable loads and a second group of loads categorized as non-delayable loads, the system comprising:

a first input to receive power from a primary power source;

a second input to receive power from a first back-up power source;

a plurality of outputs to provide power to the plurality of loads;

means for controlling the system upon loss of primary power to allocate the back-up power such that non-delayable loads will be powered before delayable loads, including means for selectively turning on and off delayable loads based on available power from the back-up power source; and means for monitoring power draw by each of the plurality of loads while operating on primary power, and means for recommending a proper type for a back-up power source for each of the plurality of loads based on the power draw.

34. The system of claim 24, wherein the means for controlling the system includes means for dynamically allocating power to the loads to maximize power draw from the back-up source in a back-up mode without exceeding an output capacity of the back-up source.

35. A system for controlling power to a plurality of loads from a plurality of power sources, wherein at least one of the plurality of power sources is a primary power source and at least one of the power sources is a back-up power source, the system comprising:

a first input to receive power from the primary power source;

a second input to receive power from the back-up power source;

a plurality of outputs to provide output power to the plurality of loads;

a plurality of controllable switches each coupled to the first input, the second input and at least one of the plurality of outputs; and a controller adapted to control the plurality of controllable switches, wherein the controller is configured to detect a loss of primary power and to control the plurality of controllable switches based on a categorization of the plurality of loads as delayable or non-delayable, and wherein the controller is configured to selectively turn on and off delayable loads based on available power from the back-up power source;

wherein a plurality of delayable loads each having an associated maximum delay time, and wherein the controller is configured to power on the at least one delayable load if the delayable load has been powered off for a time that exceeds the maximum delay time, and wherein the controller is programmable to set a maximum delay time for at least one of the delayable loads.

36. A system for controlling back-up power to a plurality of loads, the plurality of loads including a first group of loads categorized as delayable loads and a second group of loads categorized as non-delayable loads, the system comprising:

a first input to receive power from a primary power source;

a second input to receive power from a first back-up power source;

a plurality of outputs to provide power to the plurality of loads; and means for controlling the system upon loss of primary power to allocate the back-up power such that non-delayable loads will be powered before delayable loads, including means for selectively turning on and off delayable loads based on available power from the back-up power source;

wherein at least one delayable load has an associated maximum delay time, and wherein the system includes means for powering on the at least one delayable load if the delayable load has been powered off for a time that exceeds the maximum delay time, and means for setting a maximum delay time for each of the delayable loads.

* * * * *